United States Patent
Melpignano et al.

(10) Patent No.: US 7,193,991 B2
(45) Date of Patent: Mar. 20, 2007

(54) RADIO COMMUNICATION ARRANGEMENTS

(75) Inventors: Diego Melpignano, Monza (IT); Francesco Gallo, Caneva (IT)

(73) Assignee: Koninklijke Philips Electronics N.V., Eindhoven (NL)

(*) Notice: Subject to any disclaimer, the term of this patent is extended or adjusted under 35 U.S.C. 154(b) by 1006 days.

(21) Appl. No.: 10/135,353

(22) Filed: Apr. 30, 2002

(65) Prior Publication Data
US 2003/0003912 A1    Jan. 2, 2003

(30) Foreign Application Priority Data
May 1, 2001    (EP) ............................ 01201614
May 9, 2001    (EP) ............................ 01201698
Jan. 9, 2002   (EP) ............................ 02075082

(51) Int. Cl.
H04L 12/56    (2006.01)
(52) U.S. Cl. ...................... 370/352; 370/331
(58) Field of Classification Search ............. 370/345, 370/338, 349, 352, 356, 254; 455/436, 41.2
See application file for complete search history.

(56) References Cited

U.S. PATENT DOCUMENTS 5,940,431 A    8/1999  Haartsen et al. ............ 375/202
6,430,395 B2 * 8/2002  Arazi et al. ................. 455/41.2
6,675,015 B1 * 1/2004  Martini et al. .............. 455/436
2003/0035464 A1 * 2/2003  Dehner et al. .............. 375/132

FOREIGN PATENT DOCUMENTS

| WO | WO0069186 | 11/2000 |
| WO | WO0120940 | 3/2001 |
| WO | WO0101717 | 4/2001 |
| WO | WO0178246 | 10/2001 |

* cited by examiner

Primary Examiner—Derrick W. Ferris
(74) Attorney, Agent, or Firm—Paul Im

(57) ABSTRACT

An arrangement is disclosed for performing a handoff of a slave unit (MT) from a currently wireless connected first master unit ($AP_1$) of a shared resource network to a further master unit ($AP_2$) of the shared resource network, the arrangement including:

a) holding in the first master unit information about the topology of the shared resource network; and b) activating during a handoff a paging procedure in one or more further master units ($AP_{2-4}$) based on the topology, in the paging procedure the or each further master unit pages the slave unit.

21 Claims, 12 Drawing Sheets

| | AP1 | AP2 | AP 3 | AP4 | AP5 | AP6 |
|---|---|---|---|---|---|---|
| AP1 | 0 | 1 | 0 | 0 | 1 | 1 |
| AP2 | 1 | 0 | 1 | 1 | 1 | 1 |
| AP3 | 0 | 1 | 0 | 1 | 1 | 0 |
| AP4 | 0 | 1 | 1 | 0 | 1 | 0 |
| AP5 | 1 | 1 | 1 | 1 | 0 | 1 |
| AP6 | 1 | 1 | 0 | 0 | 1 | 0 |

| A | 1,6 |
|---|---|
| B | 5,6 |
| C | 2,3,5 |
| D | 3,4,5 |

FIG.12

|     | AP1 | AP2 | AP3 | AP4 | AP5 | AP6 |
|-----|-----|-----|-----|-----|-----|-----|
| AP1 | 0 | 0 | 0 | 0 | 0 | 1 |
| AP2 | 0 | 0 | 1 | 0 | 1 | 0 |
| AP3 | 0 | 1 | 0 | 1 | 1 | 0 |
| AP4 | 0 | 0 | 1 | 0 | 1 | 0 |
| AP5 | 0 | 1 | 1 | 1 | 0 | 1 |
| AP6 | 1 | 0 | 0 | 0 | 1 | 0 |

FIG.13

RADIO COMMUNICATION ARRANGEMENTS

The present invention relates to radio communications arrangements and in particular to a handoff procedure for handing over a slave unit from one master unit to another master unit in a communications network such as a local area network (LAN), as might be useful for example in handing over mobile terminals between access points in an uncoordinated frequency hopping wireless local area network. The present invention also provides a technique for deriving and distributing information about network topology in such an arrangement and provides communication units for use in the arrangement.

A current implementation of the above type in the form of a short range wireless based local area network (LAN) is known in the art as "Bluetooth" (™) communications, which is controlled by the Bluetooth standard. A fall specification for Bluetooth communications can be found through the Bluetooth Special Interests Group (SIG), whose web site can be found at "www.bluetooth.com" along with the current standard and related information.

A useful discussion of Bluetooth communications can be found in text book form in "Bluetooth, Connect Without Wires" by *Jennifer Bray and Charles F. Sturman*, published by Prentice Hall PTR under ISBN 0-13-089840-6.

Further prior art can be found in, for example, WO 01/20940, U.S. Pat. No. 5,940,431 and in US published applications 2001/0005368A1 and 2001/0033601A1, in which some aspects of the current state of the art in this field are also discussed.

The reader is referred to the above mentioned sources for general Bluetooth background information and also, for example, for clarification of terms of art used herein and not specifically covered by the abbreviations defined below.

Enabling hand-over of slave units between master units in a wireless LAN, based for example on Bluetooth techniques, is a difficult task. The time taken to establish new connections can be quite long enough for a mobile terminal (MT) acting as a slave unit to have moved out of range of its current master unit. The master unit is the mobile terminal's access point (AP) to the Bluetooth LAN and therefore communication may be lost.

When the network of access points is large, layer-3 mobility protocols help routing packets from the gateway/host (H) to the access point/Bluetooth module to which the target mobile terminal is attached. Link layer handoffs/handovers and network layer mobility protocols, however, must be properly synchronized to optimize performance and this may be compromised if long periods are taken to establish connections when a mobile terminal is moving between access points.

The connection establishment phase in many current arrangements is used each time a mobile terminal attached to a LAN by means of an access point moves towards an area covered by another access point with better signal quality. One such arrangement is disclosed in U.S. Pat. No. 5,448,569, in which a mobile station determines that the quality of transmission between itself and a current base station has degraded below a predetermined performance level. The mobile station listens in turn to each of successive frequency channels until it senses a transmission from a suitable base station. This means that the mobile station is forced into the potentially time consuming task of monitoring numerous channels in the radio environment which are at differing frequencies, so as to identify candidates for its next base station.

In WO 00/62438, a mobile terminal determines information pertaining to a set of base stations that are within a geographical region defined by the location of the mobile terminal. The mobile terminal supplies to base stations in the set information about each other, such as for example clock offsets between the base stations. The base stations accumulate information about each other and supply this to the mobile terminal to help it establish communications with base stations it has not yet encountered. During a handoff, the mobile terminal listens for beacons from the base stations and determines which one or more are in range. It then selects for connection the one and which is closest based on a received signal strength indicator (RSSI). In this arrangement, the mobile terminal uses the information it has about further bases stations in order to page them in a conventional manner but using more detailed addressing so as to try and reduce the time taken to establish a connection.

It is an object of the present invention to provide an improved radio communications arrangement. It is a further object of the present invention to provide an improved radio communications arrangement for handing over slave units between master units in a radio communications network comprising for example a shared resource network and especially a local area network. It is a further object of the present invention to provide improved communications units and methods for use therewith.

The present invention relates to radio communications using mobile radio communications units and to connections used to group them into the network. Accordingly the present invention provides a method of performing a handoff of a currently wireless connected slave unit from a first master unit of a shared resource network to a further master unit of said network, the method including:

a) holding in said first master unit information about the topology of said shared resource network; and b) activating during a said handoff a paging procedure in one or more further master units based on said topology, in which paging procedure the or each further master unit pages said slave unit. The shared resources network may be a local area network a wide area network or similar and may, for example, comprise a Bluetooth local area network in which access points are configured as the master units and mobile terminals act as the slave units.

The method may include determining in which of said master units to activate a said paging procedure on the basis of their topological proximity to said first master unit. The method may include activating said paging procedure only in further master units neighboring said first master unit, so as for example to reduce the likelihood of interference from further master units not involved in the handoff in question. The method may include said first master unit supplying to the or each further/neighboring master unit during a said handoff, paging information relating to said slave unit. This information may assist the or each neighboring master unit in paging said slave unit, such as for example an address of said slave unit. The method may include using said network topology information to select neighboring master units for the exchange of clock offset information. The method may include deriving said clock offset or offsets by exchanging time-stamped information between master units. The method may include exchanging messages between said master units through a substantially fixed network connecting them, for example an Ethernet or through a wireless network. The method may include passing in said messages said network topology information.

The method may include determining said network topology information substantially upon initialization of said shared resources network. The method may include determining said network topology information after initialization of said local area network, so as for example to determine which of the neighboring access points should be contacted to exchange clock offset information in order to take account of clock drifts which occurs during network operation.

The method may include sharing clock offset information by exporting the value of a master unit native clock to a master unit host, for example by means of a vendor specific Host Controller Interface command or by periodically sending at least one said master unit into an inquiry mode in which it communicates with other master units and uses their responses to update its estimate of their respective clock offsets.

The method may include said slave unit triggering a handoff procedure by sending a handoff request to its currently connected master unit and preferably substantially immediately entering into a continuous page scan.

The method may include said currently connected master unit forwarding said handoff request to one or more substantially neighboring said master units, preferably including a network address of said slave unit.

The method may include performing said handoff procedure as a hard hand-over in which resources allocated by said currently connected master unit ($AP_1$) to connection with said slave unit MT are not torn down or released until a connection is at least under establishment between said slave unit and a next or target master unit. In this manner, if an attempted handoff does not succeed, it may still be possible for the slave unit to return to its original connection. The original connection may for example be broken on the expiration of a preset timeout or on receipt of an acknowledgment message received from said next master unit. The method may include triggering said handoff procedure by said slave unit indicating to said currently connected master unit a degradation in radio link quality therebetween.

The method may include triggering said handoff procedure from a currently connected said master unit, for example after a slave unit currently connected thereto indicates to said master unit a degradation in radio link quality therebetween or in the event that said slave unit does not have the capability to measure said link quality itself and said link quality is monitored by said currently connected master unit.

The method may include, on receipt of a message indicative of connection of said slave unit to a next said master unit, canceling an attempt by a further said master unit at paging or connecting with said slave unit.

The method may include operating said master units in such a manner that there is substantially no overlap in coverage area between any further master units neighboring said currently connected master unit, whereby said slave unit receives identity packets from preferably only its closest further master unit.

The method may include using said network topology information to configure one or more of a group of master units with information about which of said master units are neighbors and/or what are their network/device addresses. The method may include determining said network topology information during at least one of installation of said shared resource network and in the event that a said master unit is moved. The method may include holding said network topology information in the form of a matrix indicating which said master units neighbor which others in at least part of the coverage of said shared resource network, and preferably storing a said matrix locally to one or more of said master units.

The method may include gathering said network topology information in an automatic manner. The method may include gathering said network topology information using a mobile probe adapted to probe said master units by activating an inquiry procedure in different positions within the coverage of said local area network and preferably also adapted to make a record of the response or responses from said master units to said inquiries. The method may include gathering said information in steps by performing a succession of probe inquiries, using for example an iterative process such that the accuracy of said network topology information resulting from the probing increases with an increasing number of probing inquiries being performed.

Said probe may comprise a mobile communications unit, said record preferably including a Medium Access Control address of the or each responding master unit and said record being developed for example in the form of a matrix. The method may include uploading said gathered information to a host controller which is adapted to control said master units. The method may include uploading said gathered information through a said probed master unit.

The present invention also provides a radio communications arrangement for performing a handoff of a slave unit from a currently wireless connected first master unit of a shared resource network to a further master unit of said shared resource network, said shared resource network being adapted to hold in said first master unit information about the topology of said network and further adapted to activate during a said handoff a paging procedure in one or more further master units based on said topology, in which paging procedure one or more said further master units page said slave unit.

The arrangement may be adapted to determine in which of said master units to activate a said paging procedure on the basis of their topological proximity to said first master unit. Said paging procedure may be activated only in further master units neighboring said first master unit. Said first master unit may supply to the or each further/neighboring master unit during a said handoff, paging information relating to said slave unit, which information assists the or each neighboring master unit in paging said slave unit, such as for example an address of said slave unit. Said network topology information may be used in determining which one or more of said neighboring master units should be contacted in order to derive clock offset information. Said clock offset or offsets may be derived by exchanging time-stamped information between master units. Messages may be exchanged between said master units through a substantially fixed network connecting them, for example an Ethernet or through a wireless network and said network topology information may be passed in said messages.

Said network topology information may be derived substantially upon initialization of said shared resources network. Said network topology information may be derived after initialization of said local area network, so as, for example, to update initial records in order to take account of, for example, master unit movement during network operation.

Said network topology information may be derived by exporting the value of a master unit native clock to a master unit host, for example by means of a vendor specific Host Controller Interface command or by periodically sending at least one said master unit into an inquiry mode in which it communicates with other master units and uses their responses to update its estimate of their respective clock offsets.

Said slave unit may trigger a handoff procedure by sending a handoff request to its currently connected master unit and preferably substantially immediately entering into a continuous page scan. Said currently connected master unit may forward said handoff request to one or more substantially neighboring said master units, preferably including a network address of said slave unit.

Said handoff procedure may be performed as a hard hand-over in which resources allocated by said currently connected master unit ($AP_1$) to connection with said slave unit MT are not torn down or released until a connection is at least under establishment between said slave unit and a next or target master unit. In this manner, if an attempted handoff does not succeed, it may still be possible for the slave unit to return to its original connection. The original connection may for example be broken on the expiration of a preset timeout or on receipt of an acknowledgment message received from said next master unit. Said handoff procedure may be triggered by said slave unit indicating to said currently connected master unit a degradation in radio link quality therebetween. Said handoff procedure may be triggered from a currently connected said master unit, for example after a slave unit currently connected thereto indicates to said master unit a degradation in radio link quality therebetween or in the event that said slave unit does not have the capability to measure said link quality itself and said link quality is monitored by said currently connected master unit.

On receipt of a message indicative of connection of said slave unit to a next said master unit, an attempt by a further said master unit at paging or connecting with said slave unit may be canceled.

Said master units may be operated in such a manner that there is substantially no overlap in coverage area between any further master units neighboring said currently connected master unit, whereby said slave unit receives identity packets from preferably only its closest further master unit.

Said network topology information may be used to configure one or more of a group of master units with information about which of said master units are neighbors and what are their network addresses, said network topology also possibly being used in obtaining clock offset information, e.g. from further master units so defined as neighbors. Said network topology information may be determined during at least one of installation of said shared resource network and in the event that a said master unit is moved. Said network topology information may be held in the form of a matrix indicating which said master units neighbor which others in at least part of the coverage of said shared resource network. Said matrix may preferably be stored locally to one or more of said master units.

Said network topology information may be gathered in an automatic manner and may be gathered through a mobile probe adapted to probe said master units by activating an inquiry procedure in different positions within the coverage of said local area network and preferably also adapted to make a record of the response or responses from said master units to said inquiries. Said information may be gathered in steps by performing a succession of probe inquiries, using for example an iterative process such that the accuracy of said network topology information resulting from the probing increases with an increasing number of probing inquiries being performed.

Said probe may comprise a mobile communications unit, said record preferably including a Medium Access Control address of the or each responding master unit and said record being developed for example in the form of a matrix. Said gathered information may be uploaded to a host controller which is adapted to control said master units and may be uploaded through a said probed master unit.

The present invention also provides a communications unit for use as a slave unit in a method according the invention or in a system according to the invention, said slave unit being adapted to send a handoff request to a master unit and to advertise in said handoff request a page scan time window. Said communications unit may comprise a mobile terminal of a Bluetooth local area network. Said communications unit may be adapted to enter into a substantially continuous page scan state during said advertised page scan window. Said communications unit may be adapted to select from a plurality of paging master units a particular said master unit for connection therewith.

The present invention also provides a communications unit for use as a master unit in a method according to the invention or in a system according to the invention, wherein said master unit is adapted to page a slave unit during a handoff procedure. Said communications unit may comprise an access point of a Bluetooth local area network.

Said communication unit may hold information about the topology of a local area network of which in use it forms a part, for example which master units are neighbors and what are their addresses, said network topology also possibly being used in obtaining clock offset information, e.g. from further master units so defined as neighbors.

Said communications unit may be adapted to accept handoff requests from slave units and preferably also adapted to acknowledge said handoff requests. Said communications unit may also be adapted to forward a received said handoff request to at least one neighboring master unit, preferably using a shared resource network, for example a fixed network such as an Ethernet local area network (LAN) or a wireless LAN. Said communications device may also be adapted to accept from a network a request to page at least one slave unit.

Said communications unit may be adapted to schedule paging processes used to attempt connection with a plurality of slave units. If a number of requests made from a plurality of slave units to said communications unit for connection exceeds the available capacity of said communications unit to finalize paging procedures before expiry of any one or more page scan windows of the requesting slave units, a signal indicative of congestion may be communicated to one or more further communications units acting as master units.

If said communications unit receives from a slave unit a handoff request which involves a master unit which is congested, said slave unit may be informed that it must wait for said handoff, by staying for example in a continuous page scan for an extended period.

Said communications unit may be adapted to stop paging a slave unit on or after a message is received indicative of a successful connection between a further communications unit acting as a master unit and said slave unit.

Said further communications unit may be adapted to send an acknowledgment message to at least one master unit indicative of successful paging of, and preferably also a successful connection to, a slave unit.

Said communications unit may be adapted to send and/or receive messages with further communications units acting as master units through a substantially fixed or a wireless network connection which connects together a plurality of communications units and preferably also an associated master unit host, such as for example through an Ethernet local area network.

Said communications unit may be adapted to hold said network topology information locally and preferably in the form of a matrix.

The invention will now be described by way of example only and with reference to the accompanying drawings, in which:

FIG. 12 is a table of the results of using the technique of FIGS. 11a to 11d; and FIG. 13 is a matrix of the results gathered in the table of FIG. 12.

The present invention will be described with reference to certain embodiments and drawings but the present invention is not limited thereto but only by the attached claims. Further, the present invention will be described mainly with reference to a local area network but is not limited thereto. The network may be any form of shared resource network (SRN), i.e. in an SRN hardware resources are shared, and each hardware network element can be accessed from any other network element. An SRN in accordance with the present invention is more-or-less synonymous with a CAN, LAN or WAN, but the term SRN will be used to indicate that the present invention is not limited to specific aspects of known CANs, WANs or LANs e.g. contention scheme or whether Ethernet, Token Ring or Wireless LAN. In particular, the present invention relates to a PAN—a personal area network, involving short range radio connection between mobile units and master units. Also the topology of the PAN, LAN or WAN is not considered a limit on the present invention, e.g. bus physical, star physical, distributed star, ring physical, bus logical, ring logical may all be used as appropriate. Various standards have been produced for LAN's, e.g. IEEE 802.3, IEEE 802.4, IEEE 802.5, ANSI X3T9.5 (FDDI, I and II) any of which may find advantageous use with the present invention. LAN and WAN design and construction are discussed in detail in, for example, "Mastering Local Area Networks", by Christa Anderson and Mark Minasi, SYBEX Network Press, 1999 or "Data Communications, Computer networks and Open Systems", by Fred Halsall, Addison-Wiley, 1996. Various types of wireless LAN have been standardized or are in general use, e.g. the standards IEEE 802.11, IEEE 802.11HR (Spread Spectrum) and systems based on DECT, Bluetooth, HIPERLAN, Diffuse or point-to-point infra-red. Wireless LAN's are discussed in detail in "Wireless LAN's" by Jim Geier, Macmillan Technical Publishing, 1999.

Figure 1:
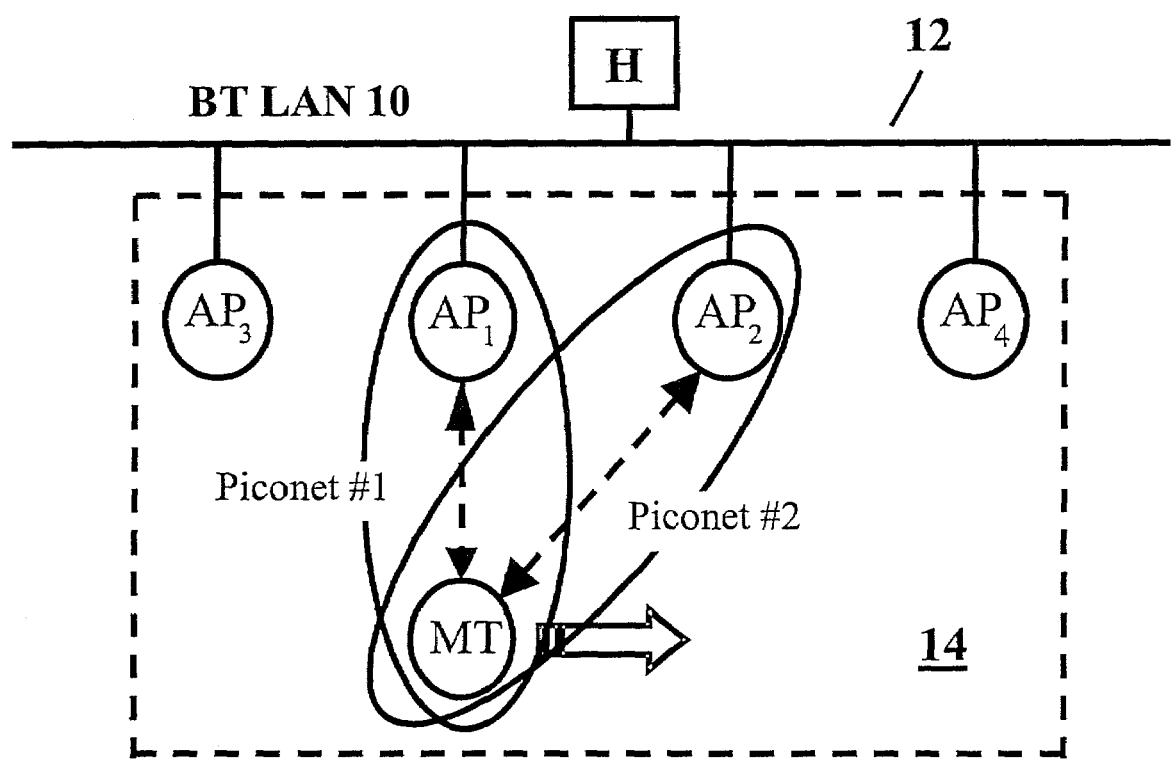
FIG. 1 is a schematic diagram of part of a local area network which is adapted to operate in accordance with an embodiment of the present invention.

Referring to the figures and for the moment in particular to FIG. 1, a wireless communications system is in the form of shared resource network 10, in this case a Bluetooth local area network (BT LAN), and comprises a slave unit in the form of a mobile terminal MT and set of master units in the form of wireless access points $AP_{1-4}$ connected together via the shared resource network 10. The word "connecting" includes within its scope wireless connections such as found in a wireless LAN, e.g. a Hiperlan, infra-red connections and other diffuse or line-of sight connections, as well as wired LAN's e.g. optical fiber, twisted pair or coaxial cable networks. A mobile terminal may include any suitable device providing wireless communications and may include a mobile phone, a personal computer such as a laptop computer or a palm top computer, a personal digital assistant (PDA), etc.

All the embodiments of the present invention can include master and slave units which communicate in accordance with the Bluetooth protocol. The features of such a system may include one or more of:

Slow frequency hopping as a spread spectrum technique, i.e. the hopping rate is slower than the modulation rate;

Master and slave units whereby the master unit can set the hopping sequence;

Each device has its own clock and its own address;

The hopping sequence of a master unit can be determined at least in part from its address;

A set of slave units communicating with one master all have the same hopping frequency (of the master) and form a piconet;

Piconets can be linked through common slave units to form a scatternet;

Time division multiplex transmissions between slave and master units;

Time Division Duplex transmissions between slaves and masters units;

Transmissions between slave and master units may be either synchronous or asynchronous;

Master units determine when slave units can transmit;

Slave units may only reply when addressed by a master unit;

The clocks are free-running;

Uncoordinated networks, especially those operating in the 2.4 GHz license-free ISM band;

A software stack to enable applications to find other Bluetooth devices in the area;

Other devices are found by a discovery/inquiry procedure; and

Hard hand-overs.

The present invention is also not limited to only the Bluetooth protocol but includes any suitable protocol for connection orientated (e.g. circuit switched) wireless arrangements which use a spread spectrum technique, such as for example frequency hopping, and lack a true broadcast, beacon or pilot channel. Some such arrangements may also be referred to as uncoordinated cellular systems in which each master unit plays the roll of a base station and a cell can be considered its coverage area. Regulatory prohibition (e.g. FCC in USA) of synchronizing master units in the Industry, Science and Medical Band (ISM 2.4 GHz), however, means that operation between cells must remain uncoordinated.

Signaling between the mobile terminal MT and the access points $AP_{1-4}$ need not be the same as the manner in which the access points communicate with each other through the shared access network 10. The access point mobile terminal signaling may advantageously use a standard Inter-Access Point Protocol (IAPP) defined in the Bluetooth Personal Area Network (BT PAN) working group. The access points $AP_{1-4}$ communicate with each other by exchanging messages through the shared resource network, e.g. through a fixed network connecting the access points $AP_{1-4}$ in the form in this exemplary case of an Ethernet LAN 12. They could also use the PAN-defined Inter-Access Point Protocol (IAPP), although other messaging schemes may be chosen such as those currently being proposed by the Internet Engineering Task Force (IETF) Seamoby Working Group for transferring context information among access points. The mobile terminals and access points preferably form a wireless network which may be uncoordinated, that is the frequencies used by the network are not necessarily coordinated with any neighboring networks. Further, the wireless network may use spread spectrum techniques to improve transmission reception quality. Well accepted forms of spread spectrum techniques are fast or slow frequency hopping and direct sequence spread spectrum, fast frequency hopping being considered as a technique in which the frequency changes more quickly than the modulation rate. Summaries of these techniques may be found in the articles: "Spread Spectrum Communication Techniques", by Tsui and Clarkson, Electronics & Communication Eng. Journal, vol. 6, number 1, February 1994, pp 3–12, and "Simplified matched filter receiver designs for spread spectrum communications applications", by Povey and Grant, Electronics & Communication Eng. Journal, vol. 5, number 2, April 1993, pp 59–64 and "Pseudo noise sequences for engineers", by Mutagi, Electronics & Communication Eng. Journal, vol. 8, number 2, April, 1996, pp 79–87.

The access points $AP_{1-4}$ are spread around an area covered by the shared resource network 10, which in the embodiment shown is an indoor area 14. The access points $AP_{1-4}$ each cover a portion of the indoor area 14 and, due to limitations in access point power, it is necessary to use a number of these access points $AP_{1-4}$ a to give adequate coverage.

While the mobile terminal MT remains substantially (but probably temporarily) stationary or at least within an area/cell covered by only its currently connected access point $AP_1$, a piconet #1 is established between them and is maintained. While the radio link quality between the currently connected access point $AP_1$ and the mobile terminal MT remains strong, no further action is immediately necessary with respect to connectivity on the part of either the access point $AP_1$ or the mobile terminal MT. If the mobile terminal MT moves and the connection weakens such that link quality is degraded, it may become necessary to hand the mobile terminal MT over to an access point $AP_{2-4}$ which has a stronger signal and/or better covers the area into which the mobile terminal MT may have moved or be heading. During a handoff procedure, such a new access point $AP_2$ is selected, a new piconet #2 between the mobile terminal MT and the new access point $AP_2$ is established and the resources reserved in the originally connected access point $AP_1$ and used to establish/maintain the original piconet #1 are torn down and released.

The handoff procedure in a BT network is traditionally a difficult task, because the time taken to establish connections can be quite long. For example, with some known paging/page scan procedures, the average time for synchronizing frequency hopping patterns ranges from tenths to hundreds of milliseconds according to channel conditions, not including the Link Management Protocol (LMP) and higher layers' message exchange.

To ensure as rapid a handoff as possible, in the present invention all access points $AP_{1-4}$ connected to the shared resource network 10 are preferably pseudo-synchronized although the present invention does not exclude that all clocks in the system are synchronized. By pseudo-synchronization is meant that, although all clocks are free-running, their respective offsets are known to each other. The aim of the pseudo-synchronization phase is to make all the clocks of the access points $AP_{1-4}$ known to each other within a certain precision, i.e. each access point $AP_{1-4}$ knows the offset between its native clock CLKN and the clocks of its neighboring access points $AP_{1-4}$. The way this is achieved in this embodiment is by exchanging messages through the shared resource network infrastructure that connects the access points $AP_{1-4}$, e.g. an Ethernet LAN or HIPERLAN.

Access point clocks are used to determine the timing and the frequency hopping pattern of the piconet #1, #2 of which they are the master. Each piconet #1, #2 is uniquely identified by the master's clock and its Bluetooth address. All slaves such as mobile terminals in a piconet #1, #2 add an offset to their native clock in order to have an estimated clock that matches the Bluetooth master's clock. Since all the clocks are free-running, the offsets must be updated regularly.

The technique employed to pseudo-synchronize the clocks of the access points $AP_{1-4}$ is similar to the Network Time Protocol specified in Network Time Protocol, RFC-1305, www.ietf.org, and is based on timestamps. The access point $AP_1$ that is interested in updating its clock offset estimate of another access point $AP_{2-4}$, sends a timestamp T1 that represents the value of its native clock. Upon receiving this message, the target access point $AP_{2-4}$ responds with a message containing T1, T2 and T3, where T1 is the original timestamp sent by the first access point $AP_1$, T2 is the value of the BT clock when the initial messages has arrived and T3 is the time stamp corresponding to the instant the response message is sent back. Upon reception of the response message at time T4, the access point $AP_1$ that had initiated the pseudo-synchronization procedure uses the values T1, T2, T3 and T4 to update its own estimate of the clock offset referred to the other access point $AP_{2-4}$.

Each mobile terminal MT maintains an estimate of the master access point's clock as follows:

$$CLK = CLKN + \text{offset} \qquad (1)$$

Where CLK is the reconstructed Bluetooth clock, CLKN is the Bluetooth free-running native clock and the offset, which is periodically updated, is used to compensate for clock drifts. Obviously, at the master CLK=CLKN.

When one access point $AP_{1-4}$ wants to perform a page procedure towards a mobile terminal MT, it needs an estimate of the paged unit's clock and it uses an estimated clock CLKE as follows:

$$CLKE = CLKN + \text{estimated\_offset} \qquad (2)$$

CLKE is used to determine the frequency used for paging along with the address of the page recipient, i.e. the mobile terminal MT.

In order for the pseudo-synchronization method described to be implemented, the Bluetooth host H must be able to read the access point's native clock. The current Bluetooth 1.1 specification does not include an HCI command that allows this feature. Such a problem can be overcome for implementation of the present invention in two different ways:

a) a vendor specific HCI command is implemented in the access point $AP_{1-4}$ to export the value of the access point native clock, for example to or through a Bluetooth host (H); or b) access point $AP_{1-4}$ pseudo-synchronization can be accomplished through the Bluetooth radio interface, i.e. access points $AP_{1-4}$ periodically go to inquiry mode trying to find other access points and inquiry responses are used to update the estimates of access point clock offsets.

When a mobile terminal MT that is connected #1 to an access point $AP_1$ needs a hand-over, it sends a handoff request to its currently connected access point $AP_1$. The mobile terminal MT may initiate the handoff simply by informing its currently connected $AP_1$ that it has detected degradation in the quality of their radio link. In the alternative, if for example the mobile terminal MT does not have the capability to measure link quality but the currently connected access point $AP_1$ does, the handoff may be initiated by the access point $AP_1$.

The mobile terminal MT then goes into a hold mode, in which it is in a continuous page scan waiting to hear from one or more potential new access points $AP_{2,3}$, i.e. it waits to recognize its identity in a data packet transmitted by a potential new access point $AP_{2-4}$.

The currently connected access point $AP_1$ communicates with at least its immediately neighboring access points $AP_{2,3}$ i.e. those into whose area of coverage the mobile terminal MT may have moved or be heading. It should be noted that the mobile terminal MT does not know the identity of those further access points $AP_{2-4}$. The further access points $AP_{2,3}$ are solicited on the basis of their proximity to the currently connected access point $AP_1$. This is achieved by holding in each access point $AP_{1-4}$ information about the network topology, i.e. which one or more access points $AP_{1-4}$ are neighbors; what are their addresses; and which of their neighbors should be contacted for the exchange of clock offset information. How this network topology information is gathered and held is discussed in greater detail further below. The neighboring access points $AP_{2,3}$ solicited by the currently connected access point $AP_1$ each activate a paging procedure in which they page the mobile terminal MT.

The handoff procedure can be implemented as a make-before-break connection, by which the handoff is a hard hand-over in which resources allocated by the currently connected access point $AP_1$ to connection with the mobile terminal MT are not torn down or released until a connection is at least under establishment between that slave unit and a next or target master unit/access point $AP_{1-4}$. In this manner, if an attempted handoff does not succeed, it may still be possible for the mobile terminal MT to return to its original connection. The original connection may for example be broken on the expiration of a preset timeout or on receipt of an acknowledgment message received from the next/new access point $AP_2$.

It will be noted that the paging procedure is activated only in access points $AP_{2,3}$ neighboring the currently connected access point $AP_1$ and not in access points $AP_4$ which are not neighbors. This use of the network topology information prevents activation of a paging procedure in access points into whose coverage area the mobile terminal MT cannot have moved, as it would have lost communication with its currently connected access point $AP_1$ during the transition. Such a loss in communication would occur due to the lack of overlap between coverage areas of the current and furthest access points $AP_{1,4}$. This feature helps avoid unnecessary interference by reducing the possibility of interference from access points $AP_4$ which are not involved in the current handoff, which interference might otherwise occur if they start paging even though they are highly unlikely to be in range of the slave unit requesting the handoff.

In the first embodiment, the paging access points $AP_{2,3}$ do not overlap in coverage and the mobile terminal MT will therefore only receive identity packets ID from its closest potential new $AP_2$, i.e. the access point into whose coverage area the mobile terminal MT has moved or is heading. In the event that coverage areas do overlap or for any other reason the mobile terminal MT does actually receive ID packets from more than one access point $AP_{2-4}$, a choice must be made about which one to connect to. At this stage, the mobile terminal MT is in a continuous page scan and can simply respond to the first identity packet it receives and thereby connect to the first access point which succeeds in paging it. A further technique available to the mobile terminal MT is the use of a Received Signal Strength Indicator (RSSI) test.

Once the connection to the new access point $AP_2$ is established, a new piconet #2 is created connecting the mobile terminal MT with its new access point $AP_2$. The establishment of the new connection #2 takes place at the link layer and is preferably seamless, such that the mobile terminal MT does not lose communication with the Bluetooth LAN 10.

Figure 2:
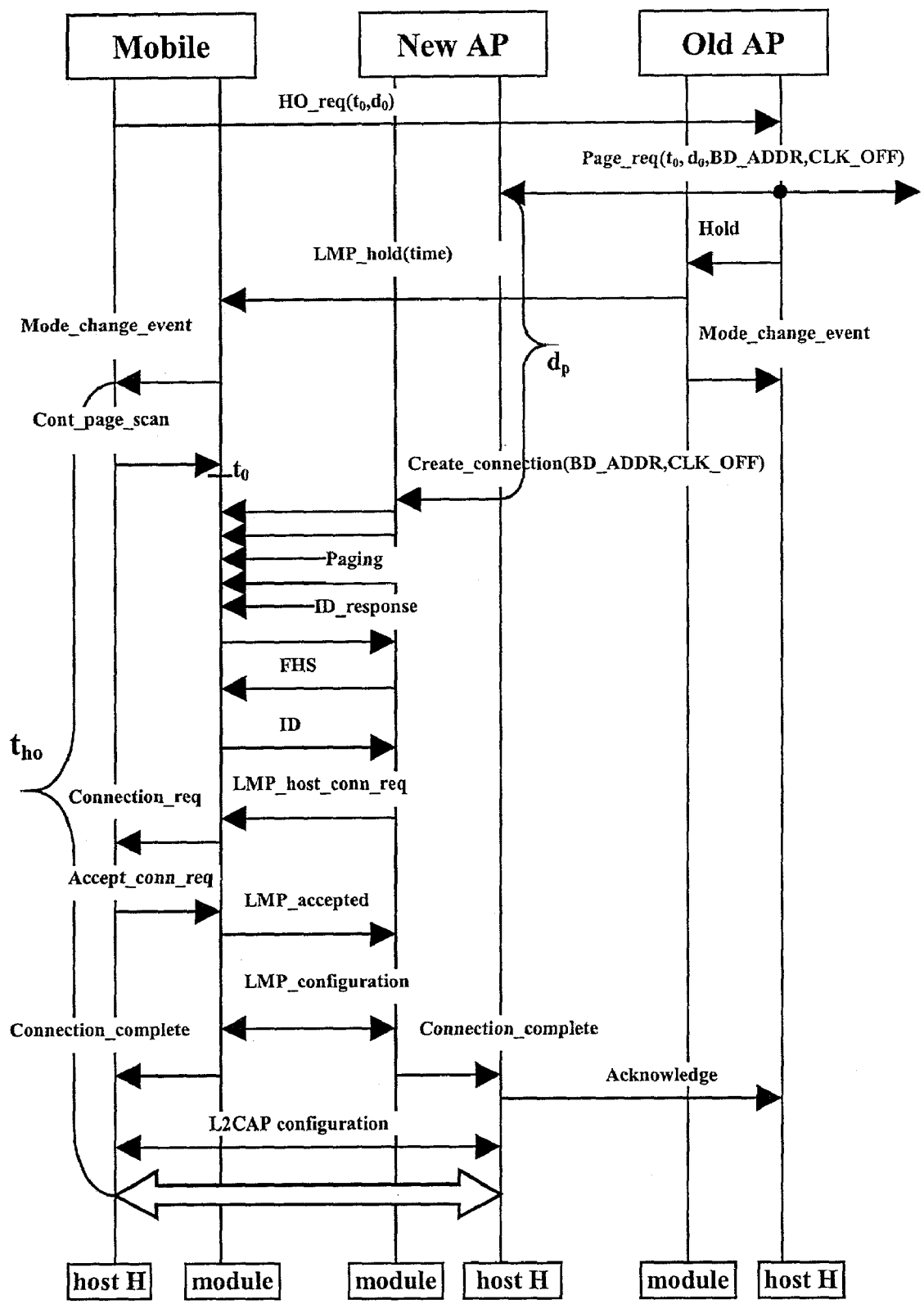
FIGS. 2 to 5 are sequence diagrams of aspects of a method according to the invention.

FIG. 2 comprises a sequence diagram providing an overall view of the handoff procedure using notation in accordance with the current Bluetooth standard and represents the sequence of events as the currently connected access point $AP_1$ (also referred to as the "Old Access Point") activates a paging procedure in the or each access point $AP_{2,3}$ which may be the next access point AP for connection (also referred to as the "New Access Point").

Using the Bluetooth notation and FIG. 2, after a handoff request (HO_req) has been received, e.g. from the mobile terminal MT to the currently connected access point $AP_1$, the currently connected access point $AP_1$ (depicted as "Old AP" in FIG. 2) transmits a multicast page request message [Page_req($t_0$,$d_0$,BD_ADDR, CLK_OFF)] to its neighboring access points $AP_2$, $AP_3$, which are the access points into whose coverage area the mobile terminal MT may have moved or be heading.

The page request message carries the Bluetooth address (BD_ADDR) of the mobile terminal to be paged, its clock offset (CLK_OFF) and timing parameters that indicate the estimated time the mobile will enter page scan ($t_0$) and its duration ($d_0$). When the handoff request has been acknowledged, the mobile terminal MT is put into hold mode (Hold) by the old access point $AP_1$, for a period of time [LMP_hold (time)] that must be carefully calculated and depends on $d_0$. During the hold mode the mobile terminal MT enters into a continuous page scan (Cont_page_scan).

At this step, the potential new access points $AP_2$ and $AP_3$ start paging the mobile terminal MT by sending identity packets [Create_connection (BD_ADDR, CLK_OFF)]. The mobile terminal MT will send an identity response packet (ID_response) to the closest access point $AP_2$.

The connection between the mobile terminal MT and the access point $AP_2$ into whose area the mobile terminal MT is moving ("New AP" in FIG. 2) is established once frequency hop sequence/synchronization (FHS) packets and subsequent identities ID have been exchanged.

From this point on, the frequency hopping pattern used in the newly formed piconet #2 follows the usual rules defined in the Bluetooth specification, and normal data exchange can begin after the link has been configured (including LMP and L2CAP configuration messages).

It should be noted however that, when the new access point $AP_2$ has successfully established a new connection with the mobile terminal MT, it informs the old access point $AP_1$ and the other access points $AP_3$ that are performing paging by sending an acknowledgment message (Acknowledge) through the shared resource network 10. This message has two functions. In the old access point $AP_1$, the resources associated with the mobile terminal MT being handed-over are torn down and released and in the other access point or points $AP_3$ that are trying to connect with the mobile terminal MT, the paging process is stopped, thereby reducing interference.

The page procedure is initiated at each access point $AP_{2,3}$ by means of the standard HCI command "hci_create_connection" sent to the communications device acting as that access point, which in this embodiment comprises a Bluetooth module. The parameters for this command are:

| | |
|---|---|
| BD_ADDR | address of the Bluetooth MT to page |
| Packet_Type | Bluetooth packet type to use in the connection |
| Page_Scan_Repetition_Mode | |
| Page_Scan_Mode | |
| Clock_Offset | MT estimated clock offset |
| Allow_Role_Switch | |

Once the connection between the mobile terminal MT and the old access point $AP_1$ has been put into hold mode and a baseband timer expires, an event (Mode_change_event) is generated through the HCI interface between the communications units/Bluetooth modules and the host controller H, i.e. in both the old access point $AP_1$ and in the mobile terminal MT. The actions resulting from this event depend on the outcome of the new connection establishment procedure, i.e. whether a new access point $AP_{2,3}$ has been able to establish a connection with the mobile terminal MT or not. The first case is shown with particular reference to FIG. 3, while the second one is depicted in FIG. 4.

Figure 3:
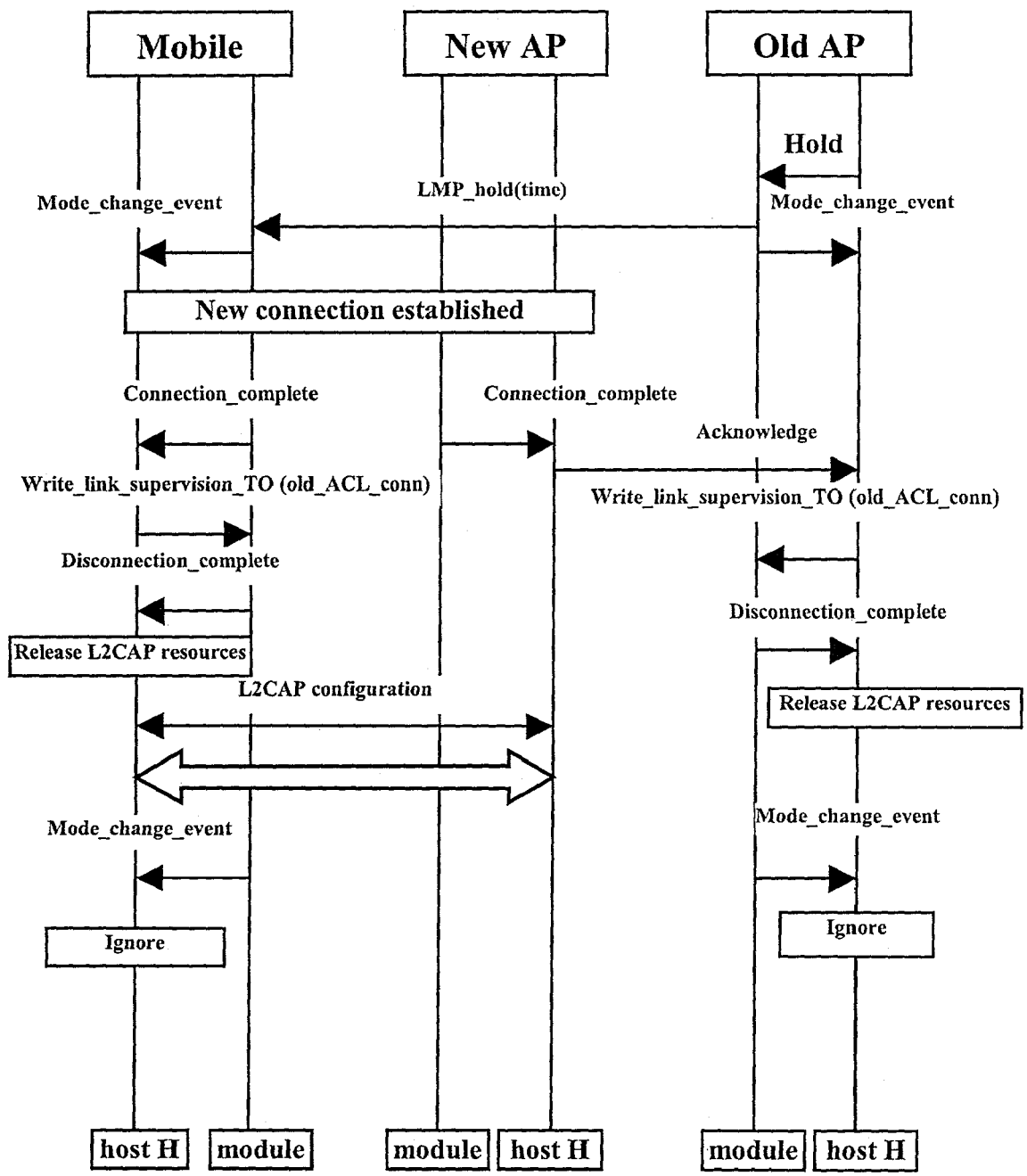

Referring for the moment in particular to FIG. 3, a successful outcome of the handoff procedure generates a connection_complete event at both the mobile terminal MT and at the new access point $AP_2$ and this is received by the host H before the return from the hold period. At this point in time, the mobile terminal MT releases the connection with the old access point $AP_1$ by simply setting a short link supervision timeout [Write_link_supervision_TO (old_ACL_connection)] and letting it expire. The same procedure can be performed at the old access point $AP_1$ as soon as an acknowledgment message from the new access point $AP_2$ is received through the shared resource network 10.

At the mobile terminal MT, L2CAP configuration follows the usual Bluetooth procedure. SDP transactions can be avoided, since a Bluetooth network guarantees that the same kind of services are supported by the access points $AP_{1-3}$ involved in the handoff procedure. When the hold period finally elapses, a mode_change_event is generated at the mobile terminal MT and at the old access point $AP_1$, which particular event is simply ignored by both Bluetooth modules MT, $AP_1$.

Figure 4:
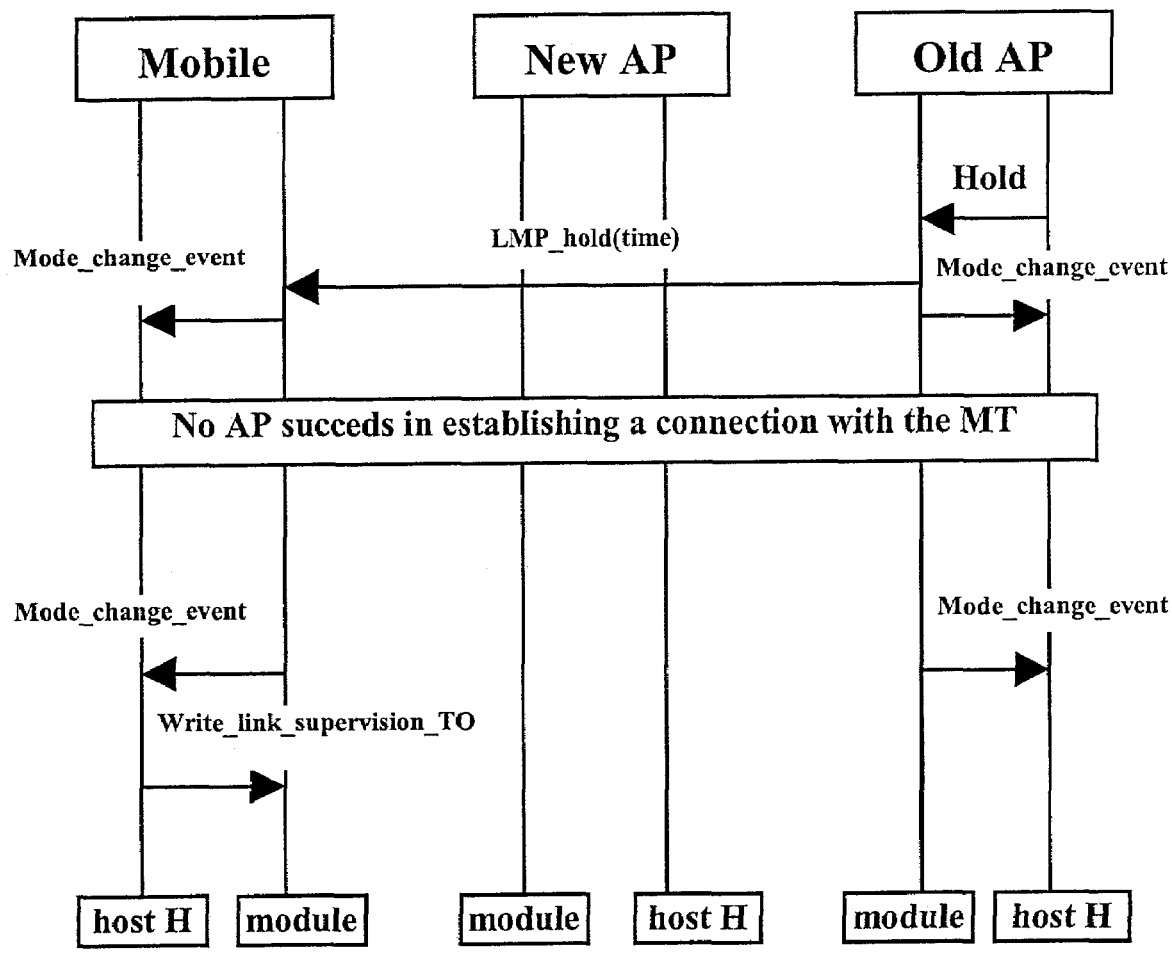

Particular reference is now made to FIG. 4, which comprises a sequence diagram of a case in which no new access point $AP_{2,3}$ succeeds in establishing a new connection with the mobile terminal MT. Return from hold mode (Hold) is signaled by a Mode_change_event at both the mobile terminal MT and at the originally connected ("old") access point $AP_1$ and, since in this case no connection_complete_event has been generated, the mobile terminal MT can try to communicate with the old access point $AP_1$ using the previous connection. If the old access point $AP_1$ is no longer in range, the link supervision timeout will naturally expire and the mobile terminal MT will be responsible for searching for a different access point $AP_{2-4}$ to connect to using, for example, the standard Bluetooth inquiry and page procedures. Under these circumstances, in order to speed up reconnection times of the mobile terminal MT, a short link supervision timeout (Write_link_supervision_TO) can be set right after the mode change event has been received. In this way, the mobile terminal MT understands more quickly if the connection with the old AP can still be used for communication.

Figure 5:
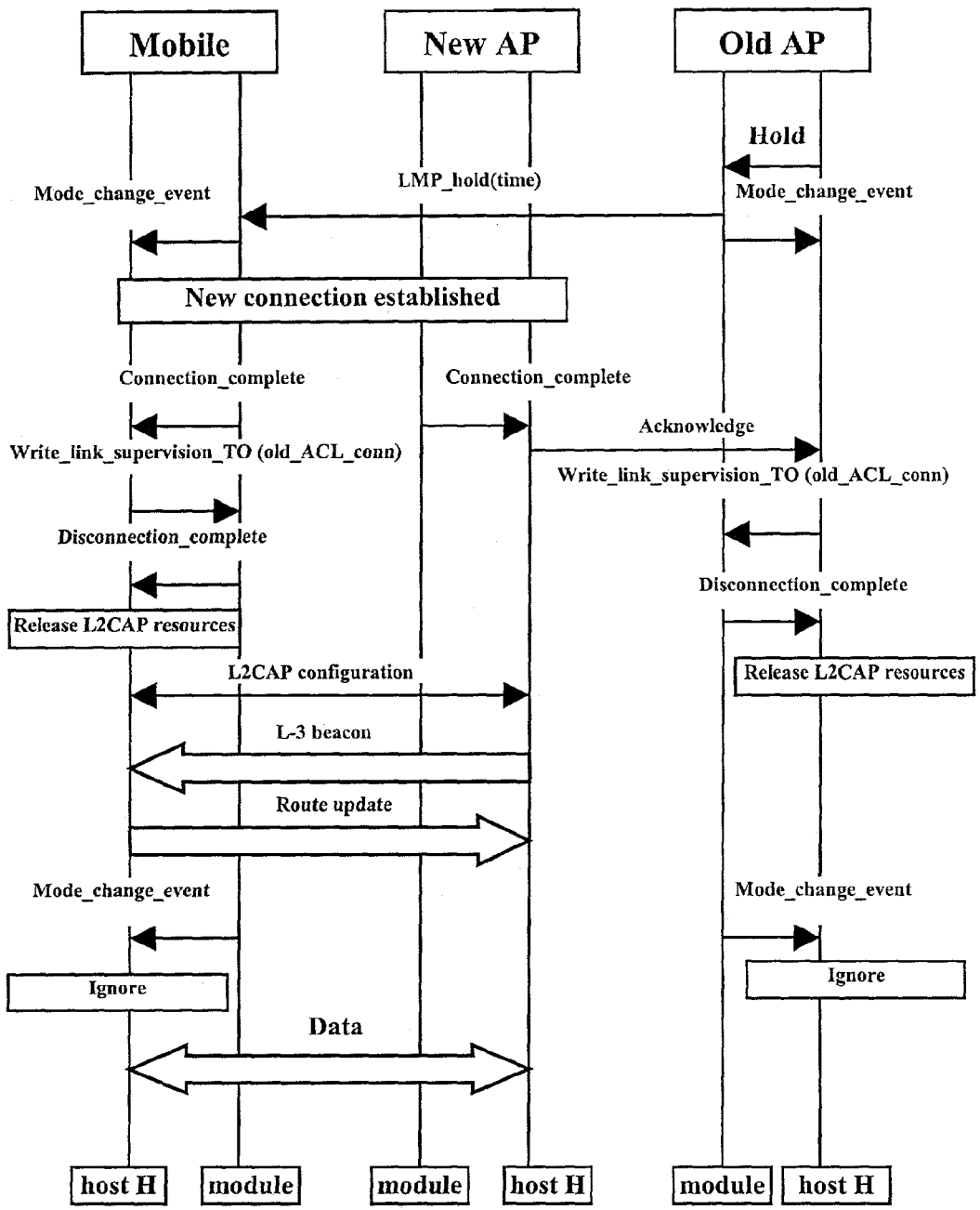

Referring now in particular to FIG. 5, a sequence diagram is provided to assist in better understanding the signaling at the network layer. The sequence diagram is similar to the sequence diagram of FIG. 2, but includes the interaction between the Bluetooth modules MT, $AP_{1,2,3}$ at Layer 2 and Layer 3.

Messages are exchanged among access points $AP_{1-4}$ and between the mobile terminal MT and its main access point $AP_1$. The heterogeneous network architecture considered here suggests base signaling using the Internet Protocol IP. This is a useful choice, as the present invention is intended to support IP mobility protocols on a Bluetooth or other networks. Examples of IP mobility protocols include Hierarchical Mobile IP (HMIP), Cellular IP and HAWAII, for which the reader is again referred to www.ietf.org.

The access points $AP_{1-4}$ pseudo-synchronize by exchanging messages through the shared resource network 10, those messages carrying timestamps T1–T4 in accordance with the NTP protocol, which is based on the User Datagram Protocol (UDP).

As soon as a new connection has been established at the link layer, the Layer 3 has to be notified so that a new route can be activated between the mobile terminal MT and the access gateway through the new access point $AP_2$. In FIG. 5, this interaction has been highlighted and in particular, right after L2CAP configuration has completed, a beacon packet (L_3 beacon) is sent to the mobile terminal MT by the Bluetooth mobility daemon (e.g. the software entity that manages the BT hand-over process and whose state machines are reported in Harel notation with particular reference to FIG. 7 for the access points AP and FIG. 8 for the mobile terminal MT, along with the annex. In this packet, Layer 3 information is included, according to the particular micromobility protocol that is being used.

When the mobile terminal MT receives the beacon, the Internet Protocol (IP) mobility daemon (i.e. the software entity that manages mobility at the network layer) sends a Route_update packet that is used in the access network to activate a path (Data) to reach the mobile terminal MT by means of the new access point $AP_2$.

Figure 6:
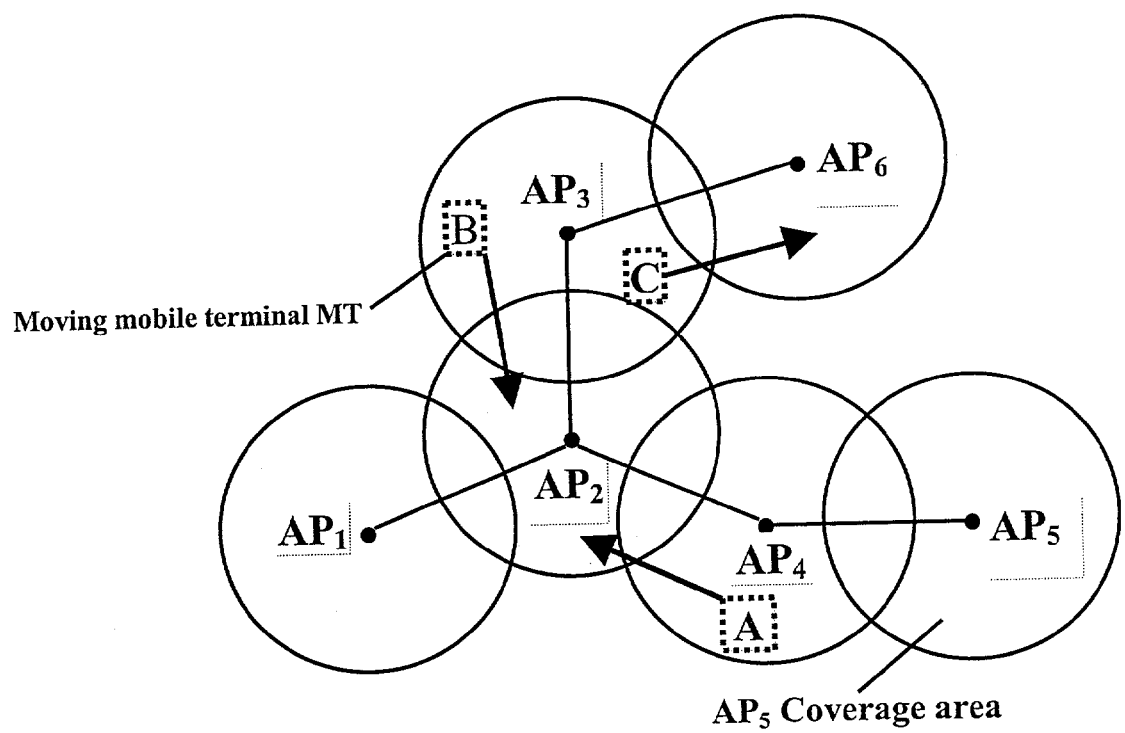
FIG. 6 is a schematic diagram of a further example of the arrangement of FIG. 1.

Particular reference is now made to FIG. 6, in which an example is given of a layout in which there are six access points $AP_{1-6}$. The access points $AP_{1-6}$ provide a service to a plurality of mobile terminals A, B, C which are able to roam between the cell coverage of any of the access points $AP_{1-6}$. For simplicity in the drawing, only the coverage area of one access point $AP_5$ has been specifically marked.

The network access points $AP_{1-6}$ have been placed in such a way that their coverage areas are slightly overlapped. However, access points $AP_{1-6}$ are spaced apart in such a way that, for example, 1 and 3 do not overlap. This applies to all access points that are non-adjacent and ensures that no two access points $AP_{1-6}$ overlap in coverage within the coverage area of any other access point $AP_{1-6}$. This lack of overlap between neighbors within the current cell ensures that a mobile terminal MT will only receive paging signals from its closest further access point during a handoff.

Two mobile terminals A, B are both moving approximately at the same time towards the cell covered by $AP_2$ and a third one C is moving to the cell covered by $AP_6$. Assuming that all of them properly notice that a handoff is needed, A would send a handoff request to $AP_4$, B and C to $AP_3$.

Since a currently connected access point $AP_{3,4}$ does not know where a mobile terminal A, B, C is directed, a request to page each moving mobile terminal A, B, C is sent to the or each access point neighboring each one that receives or initiates the page procedure.

In this manner, $AP_3$ sends two requests (one for mobile B and another for mobile C) to both $AP_2$ and $AP_6$, while $AP_4$ sends a request for A to $AP_2$ and $AP_5$. $AP_2$ therefore receives requests to page all three moving mobile terminals A, B, C. It then schedules the paging procedures and actually establishes new connections with A and B. Since C has not moved into the cell covered by $AP_2$, no response to page ID's will be obtained. Once C reaches the area of overlap between $AP_6$ and $AP_3$, however, it will be in range of AP6 and can receive paging signals from that access point.

In this case, $AP_2$ can be seen to have received from two of its neighboring access points $AP_{3,4}$ multiple requests for paging moving mobile terminals A, B, C. Those requests are scheduled so as to try and guarantee that all involved terminals A, B, C can be paged in time, i.e. before communication with their currently connected access points AP are lost. Various scheduling algorithms can be envisaged for this purpose, perhaps one of the simplest being a "first-come-first-served" policy, by means of which paging procedures are activated in the same order as handoff requests are received. In another embodiment, the policy used can be based on "earliest-deadline-first", by means of which the paging procedures are activated in an order which privileges mobile terminals whose listening window is due to expire first. Furthermore, if the number of requests to any particular access point exceeds the available capacity of that access point to finalize scheduling procedures in time, this congestion can be reported to one or more other access points, preferably to all and by using the infrastructure of the shared resource network 10. In this way, an access point which receives a handoff request which involves a temporarily congested access point can inform the requesting mobile terminal that it must wait for its handoff, by for example staying in a continuous page scan for a longer time ($d_0$).

Particular consideration will now be given to the development of the network topology information which is held in the access points of each embodiment and used by the currently connected access point to determine in which further access points to activate the paging procedure by which those further access points page the mobile terminal and also to determine which access points should be contacted for exchange of clock offset information.

Figures 9, 10:
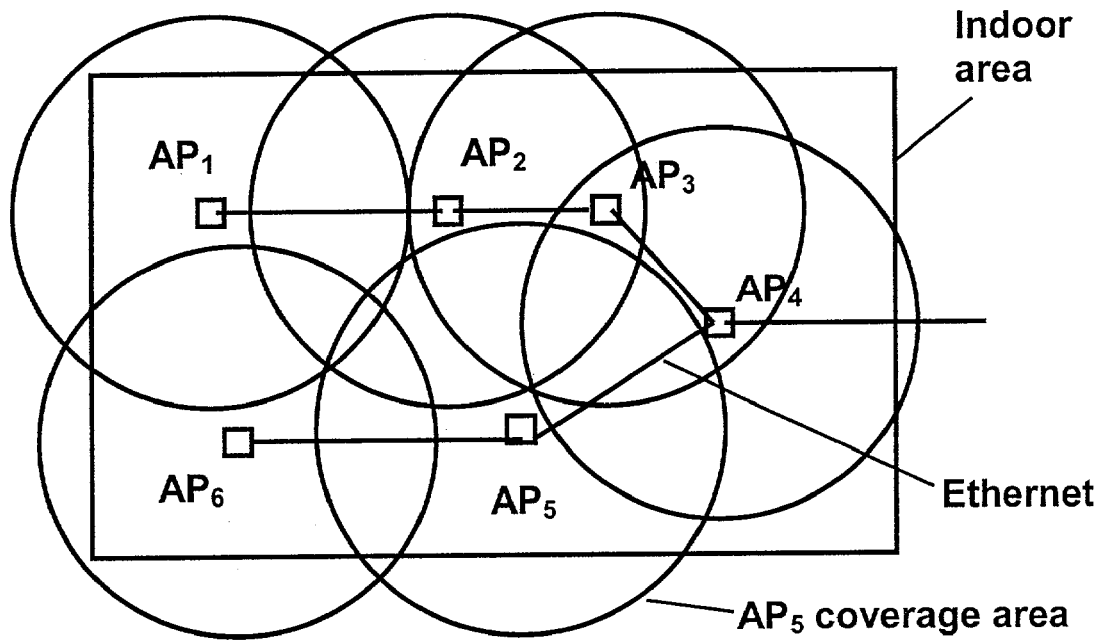
FIG. 9 is a schematic diagram of a variation to the arrangement of FIG. 1.
FIG. 10 is a matrix of the topology of access points in FIG. 9.

Referring now in particular to FIGS. 9 and 10, six access points $AP_{1-6}$ have been placed so that their overlapping coverage areas ensure network connectivity within the indoor area. All access points $AP_{1-6}$ are networked together using the shared resource network, for example, an Ethernet LAN or a HIPERLAN. Some of them are within radio range with each other (2,3 and 3,4), they all use isotropic antennas, transmit using the same power level and have equal receiver sensitivity. For simplicity in the drawing, only the coverage area of one access point $AP_5$ has been specifically marked.

FIG. 9 shows the physical layout of the particular example under consideration, along with the coverage area of the access points $AP_{1-6}$ involved. It will be noted that, unlike the example of FIG. 6, in this case several areas of coverage of neighboring access points overlap in the coverage area of each individual access point $AP_{1-6}$.

The neighbor relationship between the access points $AP_{1-6}$ is held in a matrix shown in FIG. 10 and is stored locally to each access point, preferably being held in a memory in each access point and having the ability to implement updates, for example in the event that one of the access points $AP_{1-6}$ moves within the indoor area. The network topology information that is of interest is represented in the matrix, in which a '1' in position (x,y) indicates that access point y is a neighbor of access point x, i.e. a mobile terminal that is connected to x may move towards an area covered by y. It can be noticed that the matrix is symmetrical.

By using the matrix, each access point $AP_{1-6}$ is able to determine which further access point or points are its neighbors. It is able to obtain and store the neighboring network addresses and to use this network topology information to address all of its neighbors each time a handoff request is generated. In addition to forwarding a request for a handoff to the neighboring access points, the address of the mobile terminal MT can also be included in the request, such that the neighboring access points can target the specific mobile terminal MT. In this manner, the time consuming inquiry procedure usually performed by the mobile terminal in known systems is avoided.

If the network topology is known to a system installer, it can be programmed into the access points $AP_{1-6}$ during installation, for example on initialization of the shared resource network. The network topology information can alternatively be gathered dynamically using a mobile probing technique. In any case, topology updates after initialization are useful so as, for example, to update initial records in order to take account of access point movements which might occur after initial installation or during network operation. An example of mobile probing will now be described with particular reference to FIGS. 11a to 11d, 12 and 13.

In order to build the network topology matrix dynamically, a Bluetooth mobile terminal with dedicated software and referred to for convenience as a mobile probe, is used by an operator after the network has been installed to build the network topology matrix in steps. Any Bluetooth device can be used for this purpose, provided the necessary software is used as described below, preferably recording the results automatically and initially in the mobile probe itself.

A Bluetooth inquiry procedure is activated in different positions within the indoor area and the mobile probe MT automatically records each inquiry response received from the network access points, i.e. it saves the MAC addresses of the access points. The position of the probe must not vary until the standard Bluetooth inquiry process is completed (e.g. about 10 seconds) for each of the test positions A to D shown by way of example in FIGS. 11a to 11d respectively.

Figure 11A:
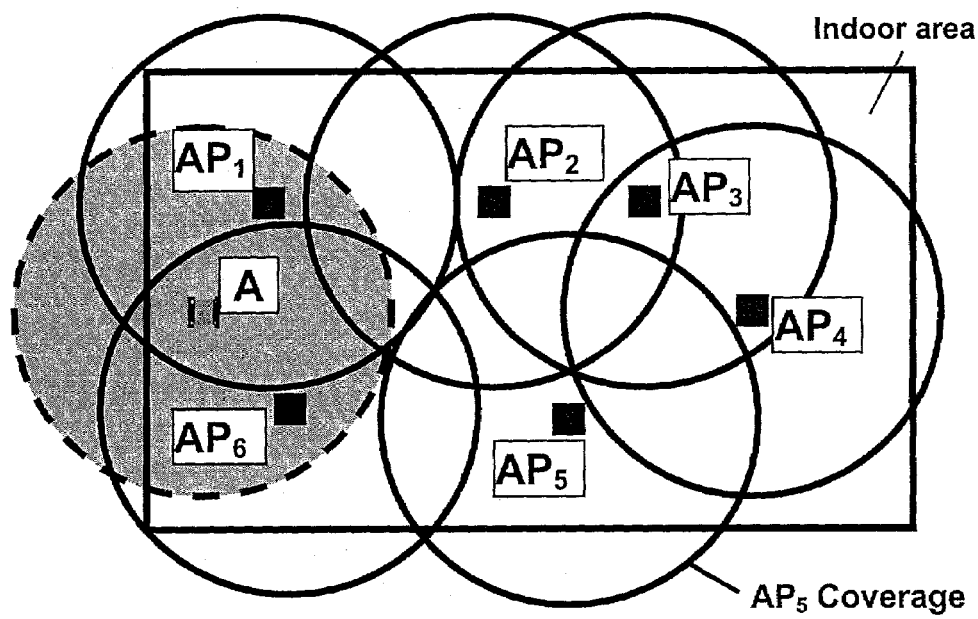
FIGS. 11a to 11d are schematic diagrams of a technique for gathering topological information about the arrangement of FIG. 9.
Figure 11B:
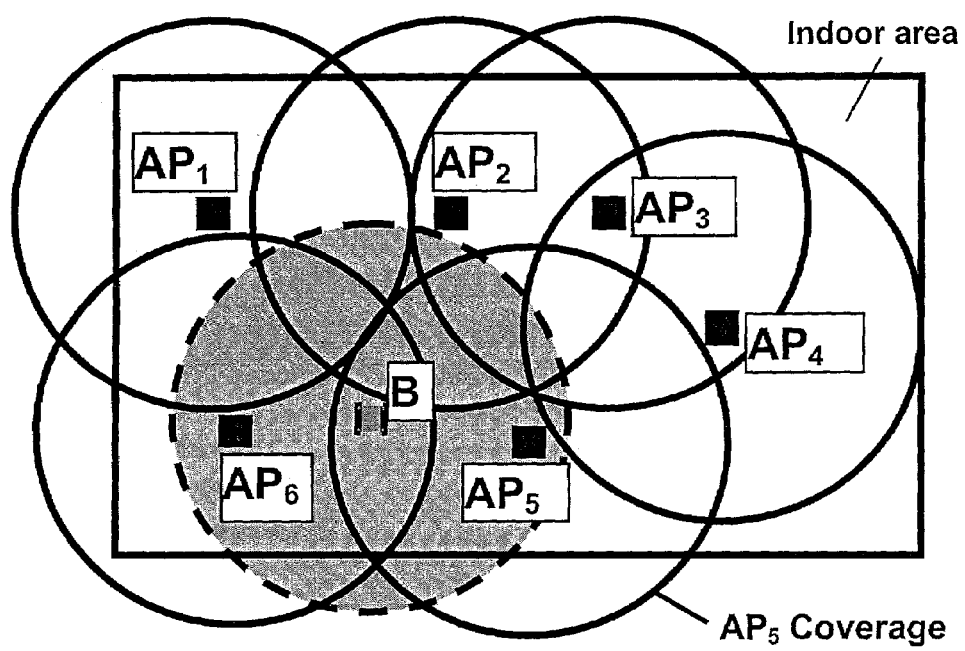
Figure 11C:
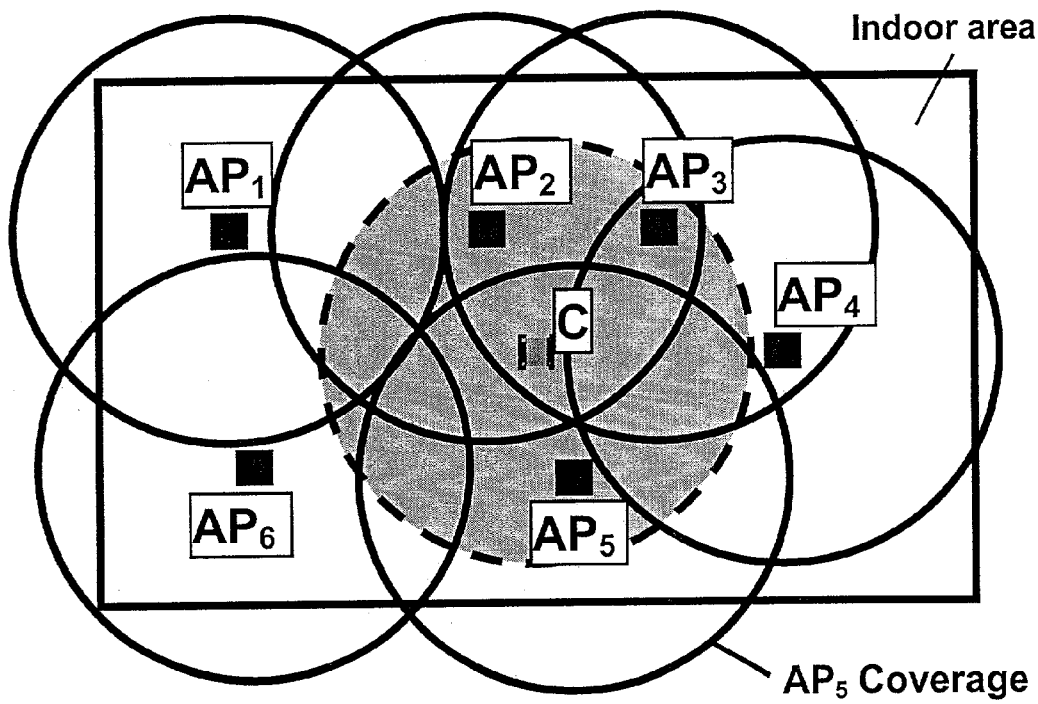
Figure 11D:
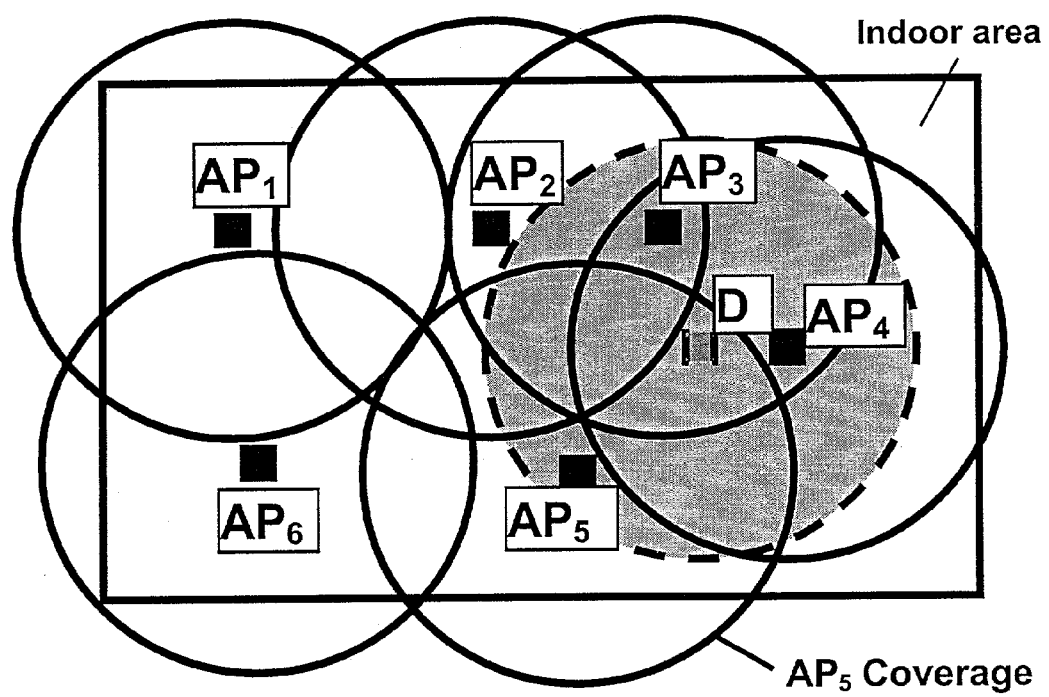

In position A, FIG. 11a, the mobile probe will get responses from access points 1 and 6. In position B, FIG. 11b, responses will be received from access points 5 and 6. In position C, FIG. 11c, the responses will be from access points 2, 3 and 5. In position D, FIG. 11d, the responses will be from access points 3, 4 and 5. The mobile probing procedure should be performed as an iterative process such that, the more tests that are performed, the more accurate the resulting network topology information will be. For the four positions A to D used by way of example, a table of results can be seen in FIG. 12.

The results of FIG. 12 can be placed in a matrix similar to that of FIG. 10 and such an arrangement is shown with particular reference to FIG. 13. Reading the matrix of FIG. 13 in the same way as that of FIG. 10 and in comparison with the full topology represented therein, it can be seen that a reasonable approximation of the neighbor relationship has already been achieved using only four inquiry positions A to D.

Once the mobile probe has collected the measurements, it builds the network topology matrix of FIG. 13 and uploads it to a management station that controls all the networked access points, such as for example a host controller. This transfer can be made using the Bluetooth link itself from the mobile probe to the management station through any of the access points, including those just probed.

Once the management station has received the topology matrix, it configures each access point with the MAC addresses of its neighbors, for example by using standard IP protocols such as the Simple Network Management Protocol (SNMP). In this way, the matrix and related network topology information such as network addresses of neighbors is loaded into each access point, where it is held locally to the access point for use during the paging procedures discussed above.

With regard to specific requirements for the communications units used as mobile terminals and access points, the following features are considered useful in implementing the present invention.

When a communications unit is used as a mobile terminal MT, it is preferably capable of monitoring radio link quality, such that it can send handoff requests to its currently connected access point $AP_1$. Once a handoff has been requested, it should enter into a continuous page scan, in which it waits to be paged by one or more access points $AP_{2,3}$ in which a paging procedure has been activated by the currently connected access point $AP_1$. When operating as a mobile terminal MT, the communications unit should preferably also be configured to make a selection from a plurality of paging communications units which are, at least for the time being, acting as master units/access points $AP_{1-4}$.

When operating as a master unit/access point $AP_{1-4}$, a communications unit should be configured to hold the topology information for the network of which it forms a part. As discussed above, that information is preferably held locally to that communications unit, preferably in the form of a matrix and including: which master units are neighbors; what are their addresses (BD_ADDR); and what are their native clocks offsets with respect to at least that particular communications unit.

The communications unit acting as a master unit $AP_{1-4}$ should also be capable of accepting handoff requests from slave units MT and preferably also capable of acknowledging those handoff requests. It should also be capable of forwarding received handoff requests to at least one neighboring master unit $AP_1$, preferably using a fixed network 12 connecting them. This unit $AP_{1-4}$ should also be able to receive requests to page at least one slave unit from the fixed network 12 and also be adapted to schedule paging processes used to attempt connection with a plurality of slave units MT.

If a number of requests from a plurality of slave units MT exceeds the available capacity of a communications unit acting as a master unit to finalize paging procedures before expiry of any one or more page scan windows of the requesting slave units, the affected communications unit should be adapted to communicate a signal indicative of the congestion to one or more further communications units acting as master units $AP_{1-6}$. If a request from a slave unit involves a master unit $AP_{1-6}$ which is congested, the slave unit should be informed by its currently connected master unit $AP_1$ that it must wait for its handoff, by for example staying in a continuous page scan for an extended period.

A situation may arise in which a communications unit $AP_3$ which is acting as a master unit and in which has been activated a paging procedure receives a message indicative of a successful connection between a further communications unit acting as a master unit $AP_2$ and the slave unit MT which was the initiator of the hand off request. Under these circumstances, the affected master unit $AP_3$ should be adapted to stop paging that particular slave unit MT. The communications unit $AP_2$ which does establish a successful connection with the slave unit MT, should send an acknowledgment message indicative of successful paging to at least one further master unit, and preferably to each other master unit which is paging the same slave unit.

While the present invention has been particularly shown and described with respect to a preferred embodiment, it will be understood by those skilled in the art that changes in form and detail may be made without departing from the scope and spirit of the invention.

| Glossary | |
|---|---|
| Code | Meaning |
| AP | Access Point |
| BT | Bluetooth |
| CAN | Controller Area Network |
| FHS | Bluetooth Frequency Hop Synchronization packet |
| HCI | Host Controller Interface |
| IAPP | Inter Access Point Protocol |
| ID | Bluetooth Identity packet |
| LAN | Local Area Network |
| MT | Mobile terminal |
| NTP | Network Time Protocol |
| RFC | Request for Comments |
| SRN | Shared Resource Network |

References Useful for Understanding the Present Invention.

The Bluetooth SIG, "Bluetooth specification v.1.1", Febuary 2001.

Cellular IP project at Columbia University: http://comet.ctr.columbia.edu/cellularip R. Ramjee, T. La Porta, "IP micro-mobility support using HAWAII", draft-ramjee-micro-mobility-hawaii-00.txt, Feb. 1999, work in progress.

Figure 7:
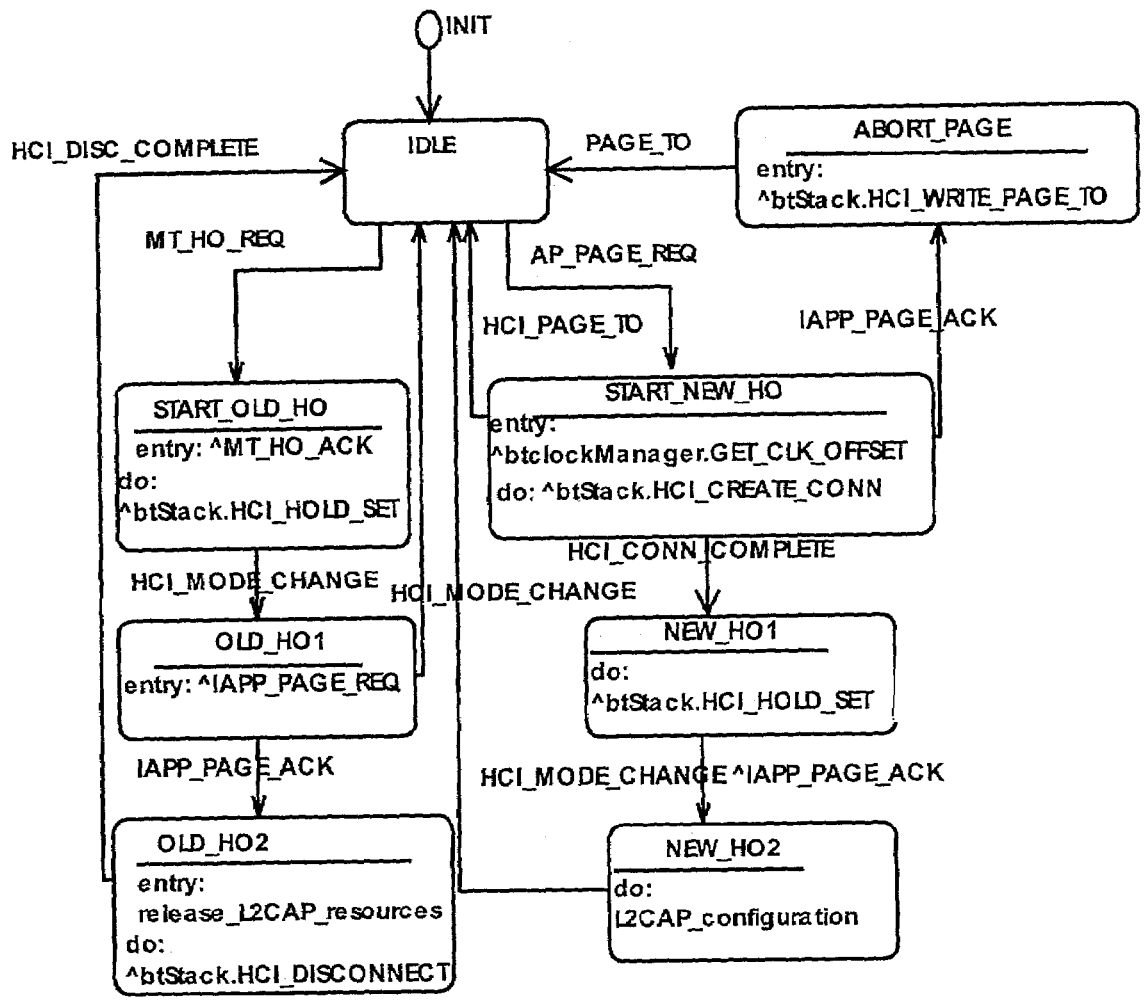
FIG. 7 is a state machine in Harel notation for an access point of the examples of FIGS. 1 and 6, the full notation for which is included in the Annex.

C. Castelluccia, "An Hierarchical Mobile IPv6 Proposal", INRIA TR-0226, Nov. 1998, http://www.inrialpes.fr/Planete/people/ccastel/index.html Annex:

| Harel notation for FIG. 7 | |
|---|---|
| State name: | |
| INIT | |
| Type: | StartState |

TABLE-continued

Harel notation for FIG. 7

State name:
IDLE
Type: Normal
Documentation:
Wait for requests from either the mobile or a neighbor access point.
State name:
START_OLD_HO
Type: Normal
Documentation:
AP has received a handoff request from a mobile terminal.
After acknowledgement, the MT is put into hold mode.
Actions:
entry: ˆMT_HO_ACK
do: ˆbtStack.HCI_HOLD_SET
State name:
OLD_HO1
Type: Normal
Documentation:
The old AP waits for the response from the new AP (who has established a new connection with MT).
Actions:
entry: ˆIAPP_PAGE_REQ
State name:
OLD_HO2
Type: Normal
Documentation:
The new AP is sent a confirmation message.
Actions:
entry:release_L2CAP_resources
do: ˆbtStack.HCI_DISCONNECT
State name:
START_NEW_HO
Type: Normal
Documentation:
An AP receives a request from another AP to start the page procedure to create a new connection with the MT.
Actions:
entry: ˆbtclockManager.GET_CLK_OFFSET
do: ˆbtStack.HCI_CREATE_CONN
State name:
NEW_HO1
Type: Normal
Documentation:
OK, we've got a new connection setup with MT. Let's put it into hold mode.
Actions:
do: ˆbtStack.HCI_HOLD_SET
State name:
NEW_HO2
Type: Normal
Documentation:
We wait for the old AP to confirm.
Actions:
do:L2CAP_configuration
State name:
ABORT_PAGE
Type: Normal
Documentation:
In order to abort current paging activity, a short page timeout is set.
Actions:
entry: ˆbtStack.HCI_WRITE_PAGE_TO
Transition from INIT to IDLE
Transition from IDLE to START_OLD_HO
MT_HO_REQ
Documentation:
Handover request sent by MT.
Transition from IDLE to START_NEW_HO
AP_PAGE_REQ
Documentation:
A page request is received: let's see if a MT is in range.
Transition from START_OLD_HO to OLD_HO1
HCI_MODE_CHANGE
Documentation:
The MT has been put into hold mode.
Transition from OLD_HO1 to OLD_HO2
IAPP_PAGE_ACK

Harel notation for FIG. 7

Documentation:
A new AP has captured the mobile.
Transition from OLD_HO1 to IDLE
HCI_MODE_CHANGE
Documentation:
No new AP has captured the mobile.
Transition from OLD_HO2 to IDLE
HCI_DISC_COMPLETE
Documentation:
The old connection is torn down.
Transition from START_NEW_HO to IDLE
HCI_PAGE_TO
Documentation:
We haven't received any response from the MT.
Transition from START_NEW_HO to NEW_HO1
HCI_CONN_COMPLETE
Documentation:
A new connection has been successfully established with the MT.
Transition from START_NEW_HO to ABORT_PAGE
IAPP_PAGE_ACK
Documentation:
Another AP has established the new connection with the MT and sends an ACK message using IAPP. As a consequence, paging is aborted.
Transition from NEW_HO1 to NEW_HO2
HCI_MODE_CHANGE ˆIAPP_PAGE_ACK
Documentation:
OK MT is in hold mode, let's acknowledge the old AP.
Transition from NEW_HO2 to IDLE
Documentation:
Confirmation from the old AP has been received.
Transition from ABORT_PAGE to IDLE
PAGE_TO
Documentation:
When the page timeout expires, the page timeout value is reset to the default (not shown in the diagram) before returning to the IDLE state.

Figure 8:
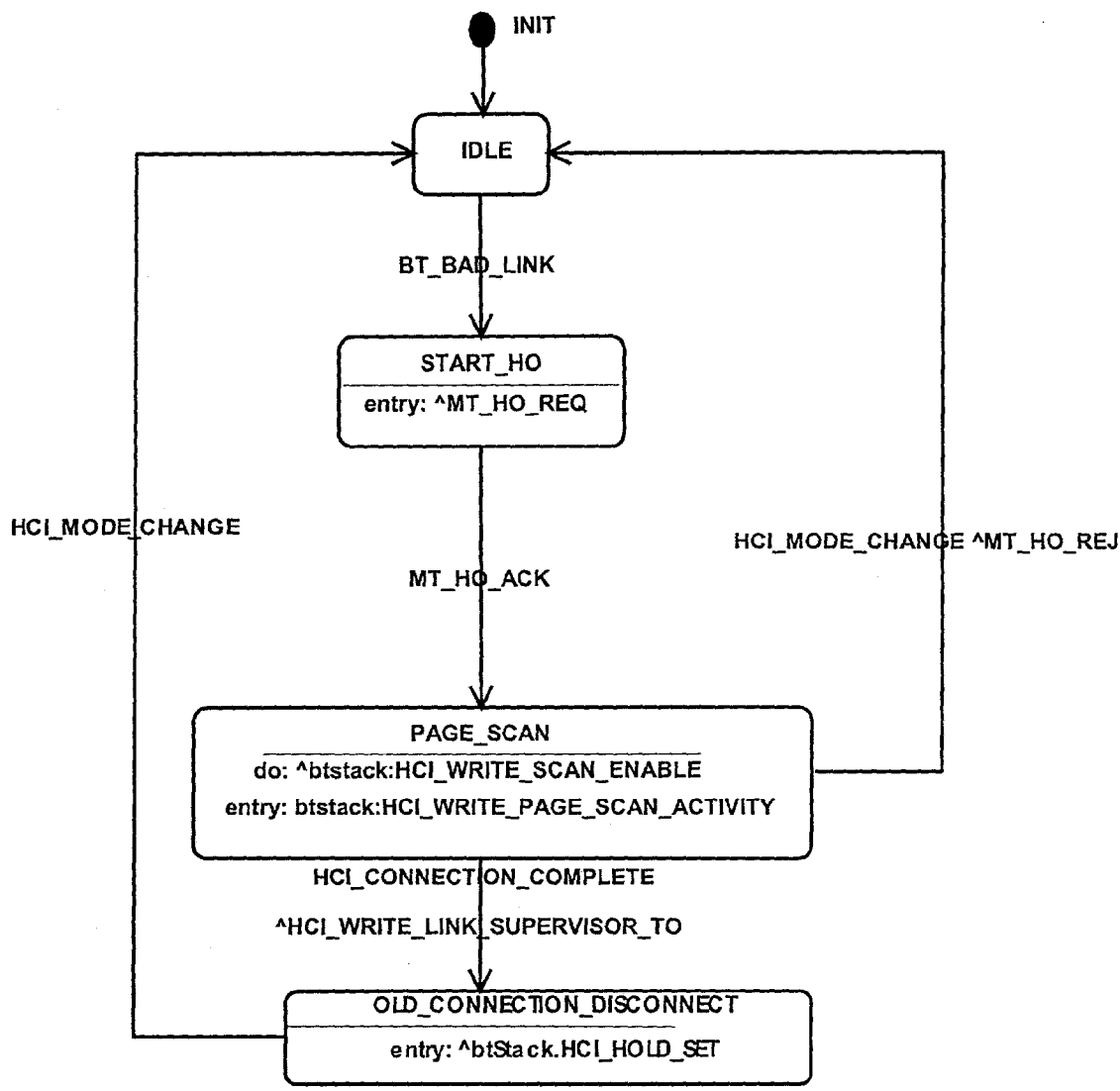
FIG. 8 is a state machine in Harv notation for an access point of the examples of FIGS. 1 and 6, the full notation for which is included in the Annex.

Harel notation for FIG. 8

State name:
INIT
Type: StartState
State name:
IDLE
Type: Normal
Documentation:
In this state the mobile terminal is assumed to have an existing connection with an access point, whose quality is periodically monitored.
State name:
START_HO
Type: Normal
Documentation:
The fast Bluetooth handoff procedure is started.
Actions:
entry: ˆMT_HO_REQ
State name:
PAGE_SCAN
Type: Normal
Documentation:
Start the paging procedure for creating a new connection with the neighbor AP, the second event between HCI_CONNECTION_COMPLETE and HCI_MODE_CHANGE_EVENT is lost.
Actions:
do: ˆbtstack:HCI_WRITE_SCAN_ENABLE
entry: ˆbtstack:HCI_WRITE_PAGE
State name:
OLD_CONNECTION_DISCONNECT
Type: Normal
Documentation:
The new connection is put into hold mode.

-continued

| Harel notation for FIG. 8 |
| --- |

Actions:
entry: ˆbtStack.HCI_HOLD_SET Transition from INIT to IDLE
Transition from IDLE to START_HO
BT_BAD_LINK
Documentation:
Link degradation event.
Transition from START_HO to PAGE_SCAN
MT_HO_ACK
Documentation:
The old AP acknowledges the handoff request. A simple case for
implementing this ack, is that AP puts the link into hold mode:
MT_HO_ACK then corresponds to a
HCI_MODE_CHANGE_EVENT.
Transition from PAGE_SCAN to (CREATE_CONNECTION)
Transition from PAGE_SCAN to IDLE
HCI_MODE_CHANGEˆMT_HO_REJ
Documentation:
If no page response arrives from neighbor AP, the connection with old AP
changes from hold_mode to active_mode. In this case,
no new connection has been established and we send a handoff reject
message to the old access point.
Transition from
PAGE_SCAN to OLD_CONNECTION_DISCONNECT
HCI_CONNECTION_COMPLETE
ˆHCI_WRITE_LINK_SUPERVISOR_TO
Documentation:
This event arrives when the mobile host is connected with the new AP.
In response, the link supervisor timeout of the connection with the old AP
is set to a short value, so that it is automatically torn down when no
data activity is detected.
Transition from OLD_CONNECTION_DISCONNECT to IDLE
HCI_MODE_CHANGE
Documentation:
Old connection resuming to active state.

The invention claimed is:

1. A method of performing a handoff of a currently wireless connected slave unit from a first master unit of a shared resource network having a topology to a further master unit of said shared resource network, the method including:
   a) holding in said first master unit information about the topology of said shared resource network;
   b) activating during said handoff a paging procedure in one or more further master units based on said topology, in said paging procedure the or each further master unit pages said slave unit; and
   c) holding said network topology information in the form of a matrix, said network topology information including which of said one or more further master units are neighbors of said first mater unit.

2. A method according to claim 1, including determining in which of said further master units to activate said paging procedure on the basis of their proximity to said first master unit, activating said paging procedure only in further master units neighboring said first master unit.

3. A method according to claim 1, including said first master unit supplying to the or each further master unit during a said handoff paging information relating to said slave unit, which information assists the or each neighboring master unit in paging said slave unit and said information includes an address of said slave unit.

4. A method according to claim 1, including using said network topology information to select neighboring master units for the exchange of clock offset information, and deriving said clock offset or offsets by exchanging time-stamped information between master units.

5. A method according to claim 1, including exchanging messages between said master units through a shared resource network connecting them, said messages including said network topology information.

6. A method according to claim 1, including determining said network topology information substantially upon initialization of said shared resource network or after initialization so as to determine which of the neighboring access points should the contacted to exchange clock offset information in order to take account of clock drifts which occur during network operation.

7. A method according to claim 1, including determining said network topology by exporting the value of a master unit native clock to a master unit host, by means of a vendor specific Host Controller Interface command or by periodically sending at least one said master unit into an inquiry mode in which it communicates with other master units and uses their responses to update its estimate of their respective clock offsets.

8. A method according to claim 1, including said slave unit triggering a handoff procedure by sending a handoff request to its currently connected master unit and entering into a continuous page scan, said currently connected master unit forwarding said handoff request to one or more substantially neighboring said master units and including a network address of said slave unit.

9. A method according to claim 8, including performing said handoff procedure as a hard hand-over in which resources allocated by said currently connected master unit to connection with said slave unit are not torn down or released until a connection is at least under establishment between said slave unit and a next or target master unit, the original connection being broken on the expiration of a preset timeout or on receipt of an acknowledgment message received from said next master unit, and if said handoff does not succeed, it is still possible for the slave unit to return to its original connection.

10. A method according to claim 1, including, on receipt of a message indicative of connection of said slave unit to a next said master unit, canceling an attempt by a further said master unit at paging or connecting with said slave unit.

11. A method according to claim 1, including operating said master units in such a manner that there is substantially no overlap in coverage area between any further master units neighboring said currently connected master unit, whereby said slave unit receives identity packets from only its closest further master unit.

12. A method according to claim 1, including using said network topology information to configure one or more of a group of master units with information about which of said master units are neighbors and what are their network addresses, holding said network topology information in said matrix indicating which said master units are neighbors, which others are in at least part of the coverage of said network, and storing a said matrix locally to one or more of said master units.

13. A method according to claim 1, including gathering said network topology information in an automatic manner, by using a mobile probe adapted to probe said master units by activating an inquiry procedure in different positions within the coverage of said shared resource network and further adapted to make a record of the response or responses from said master units to said inquiries.

14. A method according to claim 13, wherein said slave and master units comprise a mobile terminal and access points respectively of said shared resource network, and said shared resources network comprises a Bluetooth local area network.

15. A communications unit for use as a slave unit in the method of claim 1, said unit adapted;
- to send a handoff request to a master unit,
- to advertise its page scan time window in said handoff request,
- to enter into a substantially continuous page scan state during said advertised page scan time window, and
- to select from a plurality of paging master units a particular said master unit for connection therewith.

16. A communications unit for use as a master unit in a method according to claim 1, wherein said master unit is adapted to page a slave unit during a handoff procedure, and to hold information about the topology of a shared resource network of which in use it forms a part, said network topology information includes which master units are neighbors and what are their addresses.

17. A communications unit according to claim 16, adapted to accept handoff requests from slave units or from said shared resource network, and to acknowledge said handoff requests and to forward a received said handoff request to at least one neighboring master unit via a shared resource network, said unit further adapted to schedule paging processes used to attempt connection with a plurality of slave units.

18. A communications unit according to claim 17, wherein, if a number of said handoff requests made from a plurality of slave units to said communications unit for connection exceeds the available capacity of said communications unit to finalize paging procedures before expiry of any one or more page scan windows of the requesting slave units, a signal indicative of congestion is communicated to one or more further communications units acting as master units and, if said communications unit receives from a slave unit a handoff request which involves a master unit which is congested, said slave unit is informed that it must wait for said handoff, by staying in a continuous page scan for an extended period.

19. A communications unit according to claim 18, wherein said communications unit is adapted to stop paging a particular said slave unit on or after a message is received indicative of a successful connection between a further communications unit acting as a master unit and said slave unit, said further communications unit adapted to send an acknowledgment message to at least one master unit indicative of successful paging of, and successful connection to, a slave unit.

20. A radio communications arrangement adapted to perform a handoff of a currently wireless connected slave unit from a first master unit of a shared resource network having a topology to a further master unit of said shared resource network, said shared resource network being adapted to hold in said first master unit information about the topology of said network and further adapted to activate during said handoff a paging procedure in one or more further master units based on said topology, in said paging procedure one or more said further master units page said slave unit and holding said network topology information in the form of a matrix, said network topology information including which of said one or more further master units are neighbors of said first mater unit.

21. An arrangement according to claim 20, wherein said slave and master units comprise a mobile terminal and access points respectively of said shared resource network, and said shared resources network comprises a Bluetooth local area network.

\* \* \* \* \*